(12) United States Patent
Oh et al.

(10) Patent No.: US 7,499,244 B2
(45) Date of Patent: Mar. 3, 2009

(54) DISK HOLDER FOR OFF-LINE SERVO-TRACK WRITER

(75) Inventors: Dong-ho Oh, Seoul (KR); Jae-hyuk Han, Seoul (KR); Yong-kyu Byun, Yongin-si (KR); Ja-choon Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 11/341,584

(22) Filed: Jan. 30, 2006

(65) Prior Publication Data

US 2006/0171066 A1 Aug. 3, 2006

(30) Foreign Application Priority Data

Feb. 3, 2005 (KR) .................... 10-2005-0010181

(51) Int. Cl.
G11B 17/08 (2006.01)
G11B 21/02 (2006.01)
(52) U.S. Cl. ..................... 360/98.08; 360/75
(58) Field of Classification Search ... 360/98.01–98.08, 360/75; 310/242, 311
See application file for complete search history.

(56) References Cited

U.S. PATENT DOCUMENTS

| | | | | |
|---|---|---|---|---|
| 5,025,340 A * | 6/1991 | Peters | ...................... | 360/99.12 |
| 5,048,005 A * | 9/1991 | Ekhoff | ........................ | 720/707 |
| 5,056,082 A * | 10/1991 | Ekhoff | ........................ | 720/707 |
| 5,485,328 A * | 1/1996 | Radwan et al. | ............ | 360/98.08 |
| 5,644,564 A * | 7/1997 | Peters | ........................ | 720/707 |
| 5,774,445 A * | 6/1998 | Sawi et al. | ................... | 720/707 |
| 5,957,588 A * | 9/1999 | Wahl | .......................... | 384/108 |
| 6,005,747 A * | 12/1999 | Gilovich | .................. | 360/98.07 |
| 6,600,628 B2 * | 7/2003 | Kilmer | ..................... | 360/99.12 |
| 6,704,272 B1 * | 3/2004 | Hagiwara | .................... | 369/269 |
| 6,798,614 B2 * | 9/2004 | Buske et al. | ............. | 360/99.12 |
| 6,954,330 B2 * | 10/2005 | Yeom | ....................... | 360/99.12 |
| 7,133,238 B2 * | 11/2006 | Tadepalli et al. | .............. | 360/75 |

(Continued)

FOREIGN PATENT DOCUMENTS

CN 1423264 A 6/2003

(Continued)

OTHER PUBLICATIONS

English Machine Translation of JP 2002-334498.*

*Primary Examiner*—Brian E Miller
(74) *Attorney, Agent, or Firm*—Sughrue Mion, PLLC

(57) ABSTRACT

A disk holder for an off-line servo-track writer is installed at a driving motor of the off-line servo-track writer in a state in which a plurality of disks for information storage are assembled to the disk holder. The disk holder has a flange for supporting the plurality of disks, a mounting portion to be joined to the driving motor is provided at one side of the flange, and a hub is provided at the other side of the flange. A space into which air flows is formed in the hub, and the plurality of disks and a plurality of spacers for maintaining a gap between the plurality of disks are assembled around the outer circumference of the hub. A plurality of pressing members are installed at the hub to move back and forth in a radial direction of the hub.

17 Claims, 8 Drawing Sheets

U.S. PATENT DOCUMENTS

2005/0007704 A1* 1/2005 Toffle et al. ............... 360/264.1
2005/0157421 A1* 7/2005 Yeom et al. ............... 360/99.12
2005/0264927 A1* 12/2005 Lai et al. .................. 360/98.08
2005/0286164 A1* 12/2005 Oh et al. .................. 360/98.07
2006/0119977 A1* 6/2006 Zhu et al. ................ 360/77.03

FOREIGN PATENT DOCUMENTS

JP          2002-334498 A     11/2002

* cited by examiner

COMPRESSED AIR

COMPRESSED AIR

DISK HOLDER FOR OFF-LINE SERVO-TRACK WRITER

BACKGROUND OF THE INVENTION

This application claims the priority of Korean Patent Application No. 10-2005-0010181, filed on Feb. 3, 2005, in the Korean Intellectual Property Office, the disclosure of which is incorporated herein in its entirety by reference.

1. Field of the Invention

The present invention relates to a disk holder for an off-line servo-track writer for writing servo-track information to an information storage disk of a hard disk drive.

2. Description of the Related Art

A hard disk drive (HDD) is one of the information storage devices of a computer and reads data from and writes data onto an information storage disk using a read/write head. When operating, the read/write head is moved to a desired position above a rotating disk by an actuator, floating at a predetermined height from a recording surface of the rotating disk.

In such an HDD, servo-track information is recorded in advance on the surface of the disk so that the read/write head can search a wanted position on the disk and move to the wanted position quickly and precisely. This is called servo-track writing (STW). Generally, servo-track writing is performed after the HDD has been assembled. That is, after one or a plurality of disks are assembled to a spindle motor of an HDD, servo-track information is recorded on the rotating disk.

However, servo-track writing is a time-consuming process. In particular, recently, the data storage capacity of a disk of an HDD has rapidly increased. Accordingly, since the number of tracks of the disk has also increased, the time required for the servo-track writing has become gradually longer, which has increased the manufacturing cost of the HDD.

To solve the above problem, an off-line servo-track writing method is used. In this method, a plurality of disks are installed in a separate off-line servo-track writer so that servo-track writing is performed to the plurality of disks at once. Therefore, the time required for writing servo-track information to the plurality of disks is markedly reduced.

FIG. 1 shows a perspective view schematically illustrating an example of a conventional off-line servo-track writer, and FIG. 2 is a partially sectional view illustrating a disk holder shown in FIG. 1.

Referring to FIG. 1, a driving motor 12 for rotating a plurality of disks 21, a head supporting portion 30 having a plurality of heads for writing servo-track information onto the plurality of disks 21, and a head driving portion 33 for driving the head supporting portion 30 are provided on a bed 11 of an off-line servo-track writer. The plurality of disks 21 are fixed in the disk holder 20 and rotated by the driving motor 12 together with the disk holder 20.

Referring to FIG. 2, the disk holder 20 is fixed to a chuck (not shown) connected to the driving motor 12 and is rotated by the driving motor 12 together with the chuck. To this end, the disk holder 20 is comprised of a hub 24 on which the plurality of disks 21 are fitted, spacers 25 which are fitted around the outer circumference of the hub 24 to keep a set distance between the plurality of disks 21, and a clamp 26 fitted to the end of the hub 24 for fixing the plurality of disks 21 to the hub 24.

In the conventional disk holder 20 configured as described above, there must be a predetermined gap (G) between the outer circumferential surface of the hub 24 and the inner circumferential surfaces of the disks 21 so that the plurality of disks 21 can be easily fitted around the outer circumferential surface of the hub 24. However, due to the gap (G), some of the plurality of disks 21 may be assembled eccentrically with respect to the rotational center of the disk holder 20.

In this case, the positions for recording servo-track information on these disks 21 may differ from each other. Accordingly, when the plurality of disks 21 are installed on the spindle motor of an HDD, phase disparities between individual disks 21 may occur, and repeatable run-out (RRO) occurs when the HDD is operated.

SUMMARY OF THE INVENTION

To solve the above-described problems, the present invention provides a disk holder for an off-line servo-track writer, which minimizes an eccentric assembly of a plurality of disks.

Accordingly, there is provided a disk holder installed at a driving motor of an off-line servo-track writer, the disk holder, comprising: a flange supporting a plurality of disks; a mounting portion provided at one side of the flange and joined to the driving motor; a hub is provided at the other side of the flange and having a space into which air flows, the plurality of disks and a plurality of spacers for maintaining a gap between the plurality of disks being mounted around the outer circumference of the hub; a plurality of pressing members installed on the hub to be able to move back and forth in a radial direction of the hub by the pressure of air flowing into the hub, thereby being projected out of the outer circumferential surface of the hub and pressing the inner circumferential surfaces of the plurality of disks and the plurality of spacers; and a clamp joined to one end portion of the hub and fixing the plurality of disks and the plurality of spacers.

According to one aspect of the present invention, the hub may have a cylindrical shape. In addition, a plurality of slots extended in the lengthwise direction of the hub are formed equidistantly along the outer circumference of the hub, and the plurality of pressing members are inserted into the plurality of slots. In this case, the number of the pressing members may be three. In addition, the clamp may be joined to the one end portion of the hub with a screw.

According to another aspect of the present invention, the clamp has a rod that may be inserted into and fixed to the hub. In this case, the hub may have an external cylinder and an internal cylinder installed in the external cylinder to be spaced a predetermined gap from the external cylinder.

In addition, a first air flow space may be formed in the internal cylinder, and a second air flow space may be formed between the internal cylinder and the external cylinder, and a plurality of air channels for connecting the first air flow space and the second air flow space may be formed in the internal cylinder.

Further, a plurality of slots extended in the lengthwise direction of the external cylinder may be formed equidistantly along the outer circumference of the external cylinder, and the plurality of pressing members may be inserted into and installed in the plurality of slots.

Further, a fixing means for fixing the rod of the clamp to the hub may be provided in the internal cylinder.

Here, the fixing means may comprise: a movable plunger which is installed in the internal cylinder to be able to move upward and downward and having at one end a rod hole into which the rod is inserted; a spring installed between the internal cylinder and the movable plunger to apply a predetermined elastic force to the movable plunger; a plurality of bearing accommodating holes formed around the rod hole of the movable plunger; a plurality of bearings accommodated in the plurality of bearing accommodating holes; and a bearing withdrawal groove formed at the inner surface of one end portion of the internal cylinder, wherein when the rod is inserted into the rod hole, and the movable plunger is moved in one direction by the elastic force of the spring, the plurality of bearings are caught by a groove formed at the outer circumferential surface of the rod, thereby fixing the rod in the rod hole, and when the movable plunger is moved in the opposite direction by the pressure of air flowing into the internal cylinder, the plurality of bearings withdraw to the bearing withdrawal groove, thereby separating, the rod from the rod hole.

In this case, each of the plurality of bearing accommodating holes may have a tapered shape so that the bearings cannot be separated from the respective bearing accommodating holes.

In the present invention, an air injection orifice for injecting air to the inner space of the hub may be formed in the mounting portion. In addition, the mounting portion can be inserted and installed into a chuck joined to the driving motor. In this case, the mounting portion may be fixed the chuck by a collet installed in the chuck, and when the collet is loosened by the pressure of air supplied to the inside of the chuck, the mounting portion is separated from the chuck

BRIEF DESCRIPTION OF THE DRAWINGS

The above aspects and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 1:
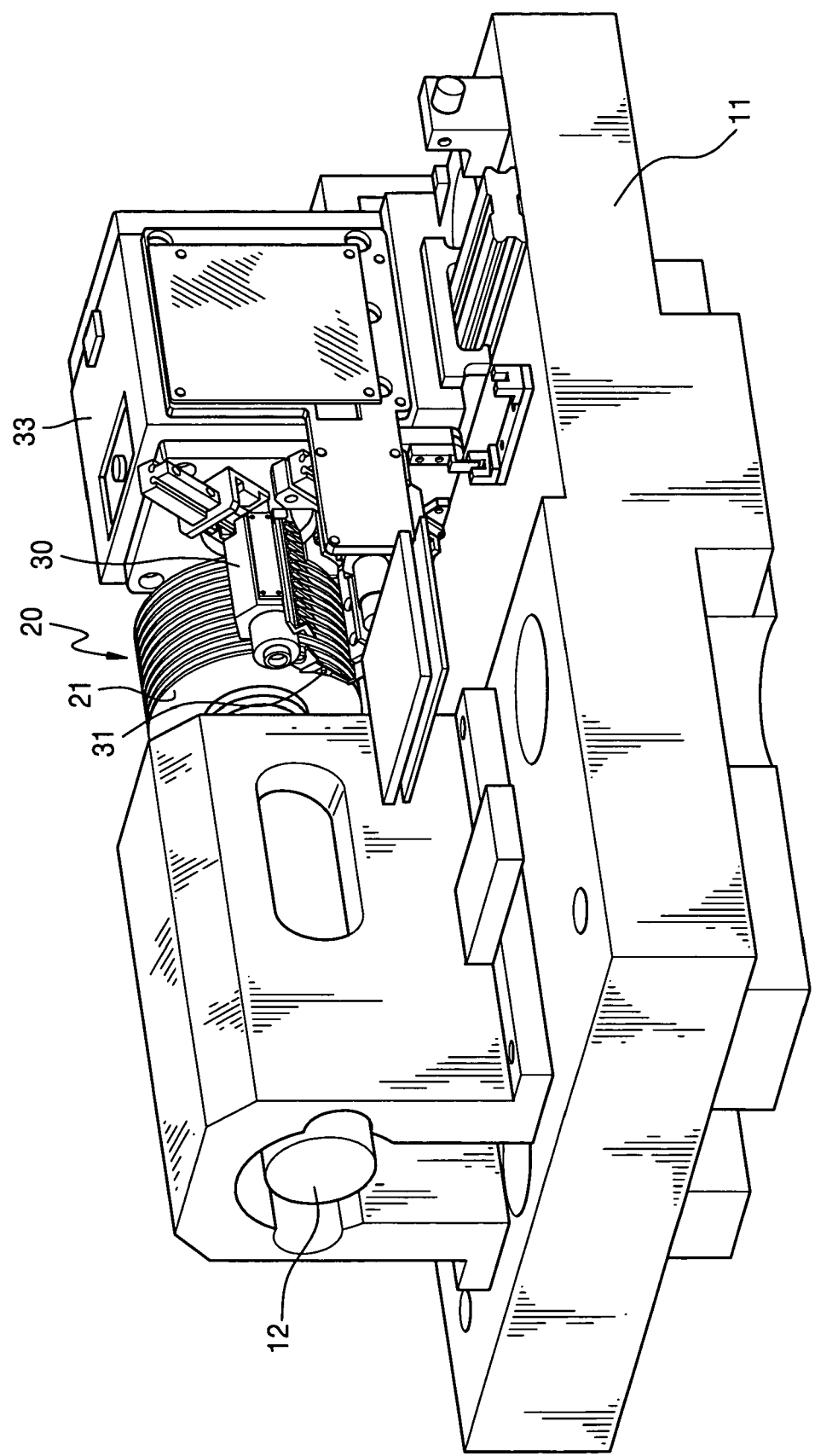
FIG. 1 is a perspective view schematically illustrating an example of a conventional off-line servo-track writer.
Figure 2:
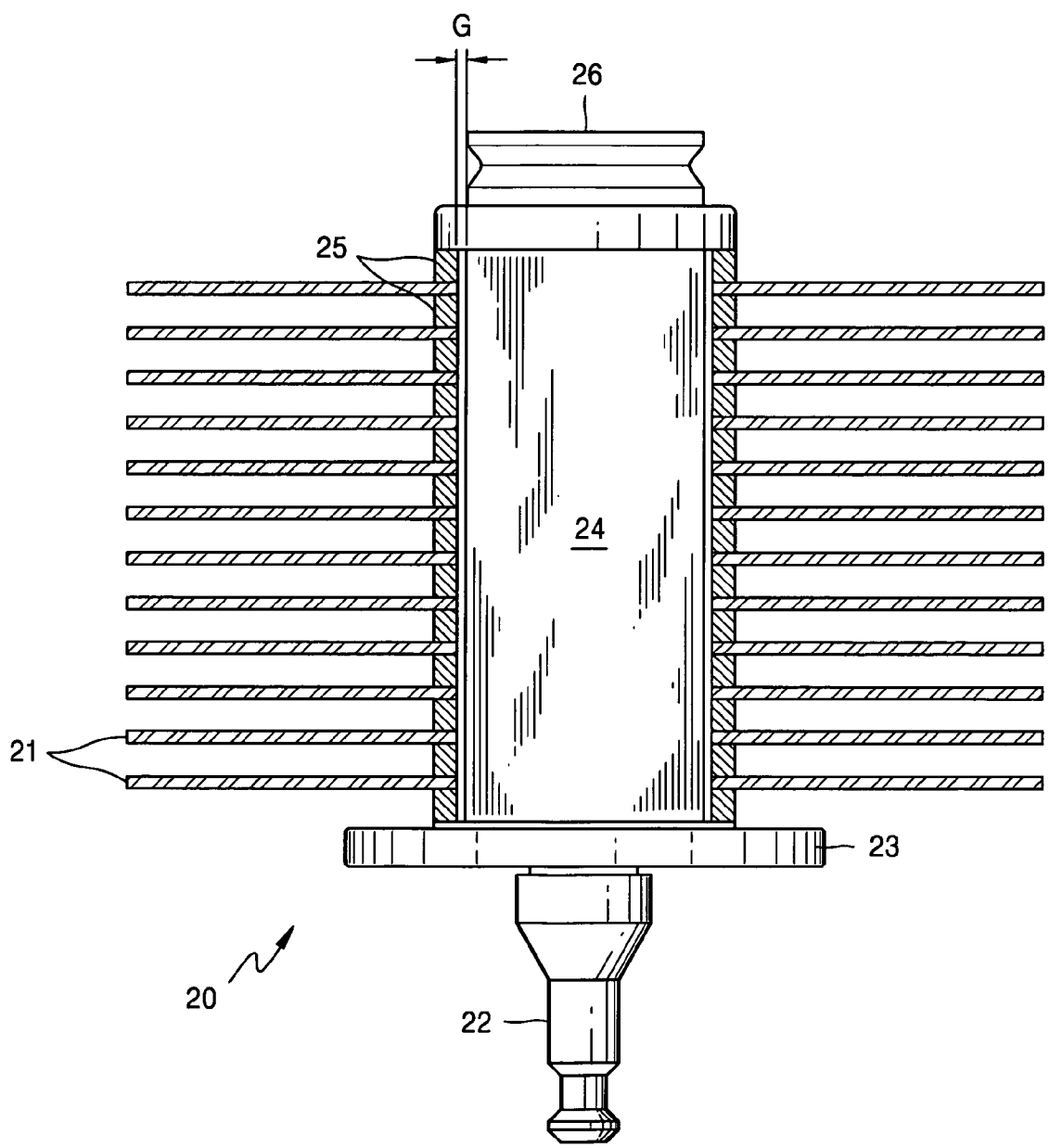
FIG. 2 is a partially sectional view illustrating a disk holder shown in FIG. 1.

Illustrative, non-limiting embodiments of the present invention will be described with reference to the attached drawings. In the drawings, the same reference numerals denote the same components.

Figure 3:
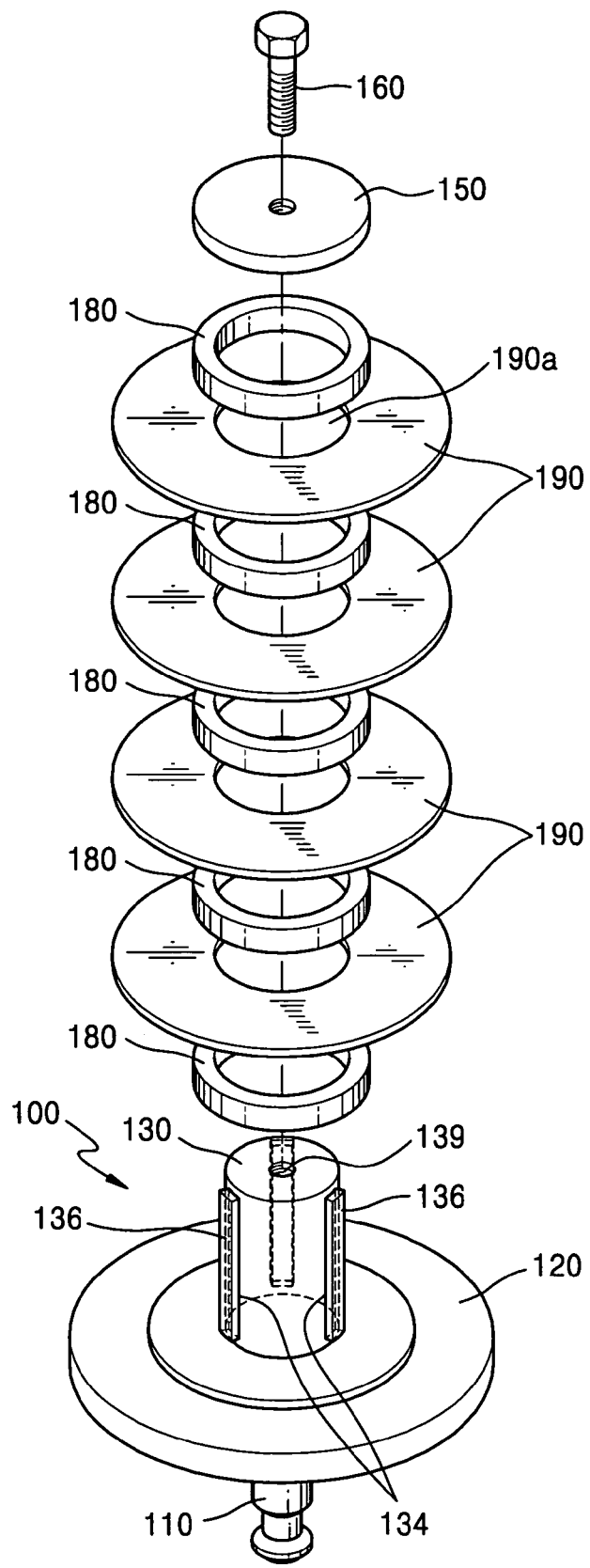
FIG. 3 is an exploded perspective view illustrating a disk holder for an off-line servo-track writer according to an exemplary embodiment of the present invention.
Figure 4:
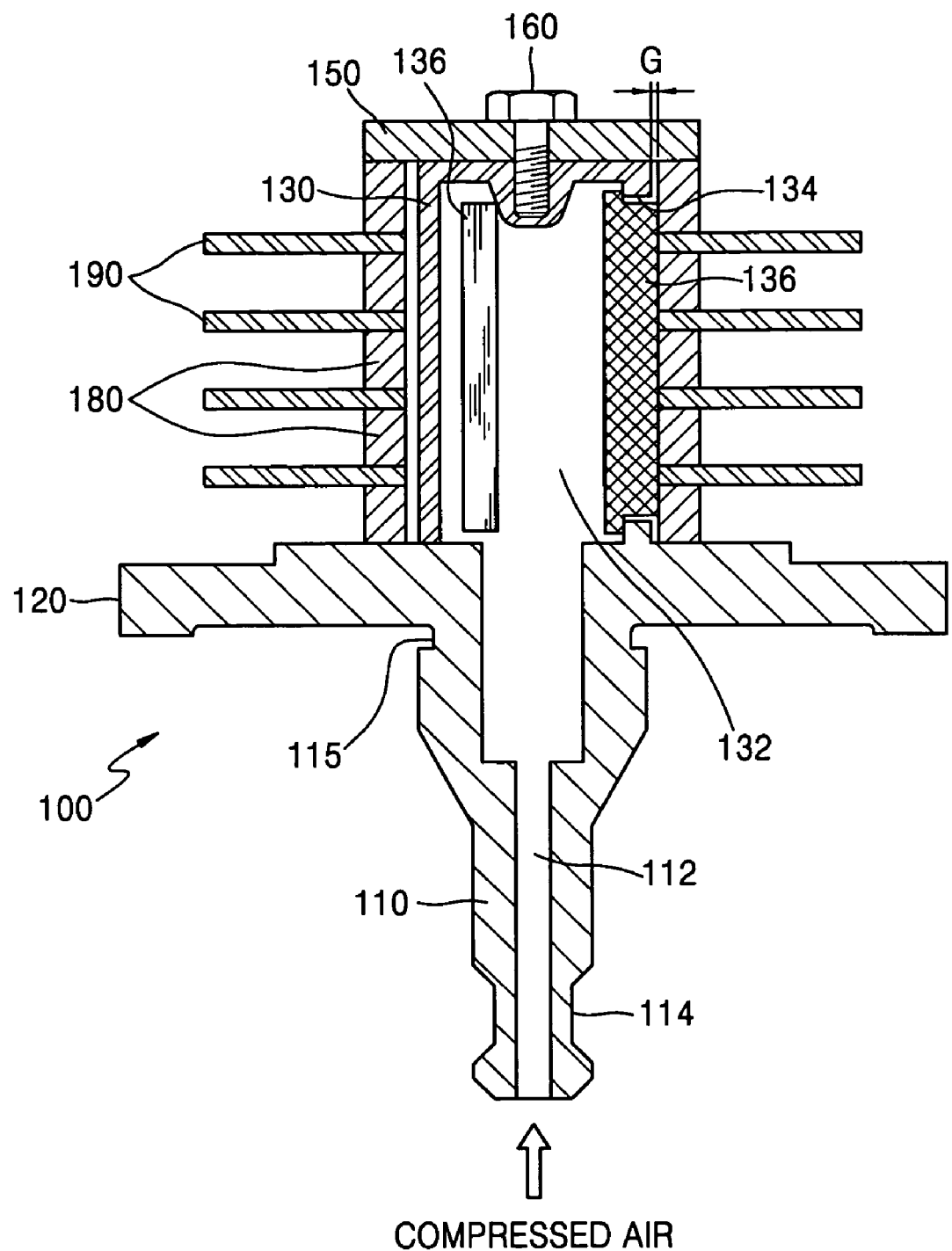
FIG. 4 is a sectional view of the disk holder shown in FIG. 3 in an assembled state consistent with the present invention.

FIG. 3 is an exploded perspective view illustrating a disk holder for an off-line servo-track writer according to an exemplary embodiment of the present invention, and FIG. 4 is a sectional view of the disk holder shown in FIG. 3 in an assembled state according to the present invention.

Referring to FIGS. 3 and 4, a disk holder 100 according to an embodiment of the present invention is installed at a driving motor of an off-line servo-track writer in a state in which a plurality of information storage disks 190 are assembled to the disk holder 100.

In the present embodiment, the disk holder 100 comprises a flange 120, a mounting portion 110 provided at one side of the flange 120, a hub 130 which is provided at the other side of the flange 120, the plurality of disks 190 being assembled around the outer circumference of the hub 130, a plurality of pressing members 136 installed on the hub 130, and a clamp 150 which is assembled to an end portion of the hub 130.

The flange 120 serves to support the plurality of disks 190 assembled around the hub 130, and has a disk shape having a predetermined diameter.

The mounting portion 110 is formed to project a predetermined length from one side surface of the flange 120, and is installed by being inserted into the driving motor of the off-line servo-track writer. An air injection orifice 112 is formed through the inside of the mounting portion 110 in a lengthwise direction, and a first groove 114 and a second groove 115 are formed at the outer circumferential surface of the mounting portion 110. The mounting portion 110 will be described in detail later.

The hub 130 is formed to project a predetermined length from the other side surface of the flange 120, and has a cylindrical shape having a constant outside diameter. The center axis of the hub 130 is on the same line with the center axis of the mounting portion 110, and coincides with the center axis of the rotating shaft of the driving motor of the off-line servo-track writer. The plurality of the disks 190 and a plurality of spacers 180 for maintaining a distance between the plurality of disks 190 are assembled around the outer circumference of the hub 130. The length of the hub 130 may vary with the number of the disks 190 assembled around the outer circumference of the hub 130. In addition, the outside diameter of the hub 130 has a length slightly smaller than the diameter of the center holes 190a of the disks 190 so that the disks 190 can be easily fitted around the outer circumference of the hub 130. Accordingly, a predetermined gap G is formed between the outer circumferential surface of the hub 130 and the inner circumferential surfaces of the disks 190. In addition, since the hub 130 has a cylindrical shape as described above, a predetermined space 132 is formed in the hub 130, and air flows into the space 132 through the air injection orifice 112 formed in the mounting portion 110.

The plurality of pressing members 136 are installed on the hub 130 to be able to move back and forth in a radial direction of the hub 130. Concretely, a plurality of slots 134 extended in the lengthwise direction of the hub 130 are formed at the hub 130 equidistantly along the circumference of the hub 130, and the plurality of pressing members 136 are inserted and installed in the plurality of slots 134, respectively. The number of the slots 134 and the pressing members 136 may be three, respectively, and the slots 134 and the pressing members 136 are provided equidistantly along the circumference of the hub 130. However, the number is not limited to three, and number of the slots 134 and the pressing members 136 may be four or greater, respectively. The pressing members 136 can be projected out of the outer circumferential surface of the hub 130 by the pressure of air flowing into the air flow space 132 in the hub 130. The projected pressing members 136 are pressed to the inner circumferential surfaces of the disks 190 and the inner circumferential surfaces of the spacers 180.

The clamp 150 is attached to one end of the hub 130 to serve to press the disks 190 and the spacers 180 and fix them. The clamp 150 may be attached to the one end of the hub 130 with a clamp fixing screw 160. To this end, a screwing hole 139 into which the clamp fixing screw 160 is inserted, is formed in the one end of the hub 130.

The procedure of firmly assembling the plurality of disks 190 to the disk holder 100 having the structure as described above will now be described.

First, the plurality of disks 190 and the plurality of spacers 180 are assembled around the outer circumference of the hub 130 in a state in which compressed air is not supplied to the air flow space 132 in the hub 130. At this time, since the plurality of pressing members 136 installed at the hub 130 can be pushed toward the inner side of the hub 130, the disks 190 and the spacers 180 can be assembled to the hub 130 easily without interfering with the pressing members 136.

Subsequently, compressed air is supplied to the air flow space 132 in the hub 130 through the air injection orifice 112 formed in the mounting portion 110. Then, while the pressing members 136 are projected out of the outer circumferential surface of the hub 130 by the pressure of the compressed air, the pressing members 136 are pressed to the inner circumferential surfaces of the disks 190 and the spacers 180. At this time, since the plurality of pressing members 136 are disposed along the outer circumference of the hub 130 equidistantly, and the pressure of air acting on the plurality of pressing members 136 is uniform, each of the disks 190 contacting the pressing members 136 receiving a uniform force along a circumferential direction. Therefore, since the rotational center axes of the respective disks 190 coincide with the rotation center axis of the hub 130, eccentric assembly of the plurality of disks 190 can be prevented.

Next, the clamp 150 is attached to the one end of the hub 130 by using the clamp fixing screw 160, and, therefore, the disks 190 and the spacers 180 are firmly fixed in this position. Then, even though the supply of the compressed air is stopped, and the pressure applied to the pressing members 136 disappears, the disks 190 and the spacers 180 can be firmly maintained in this position by the clamp 150.

Figure 5:
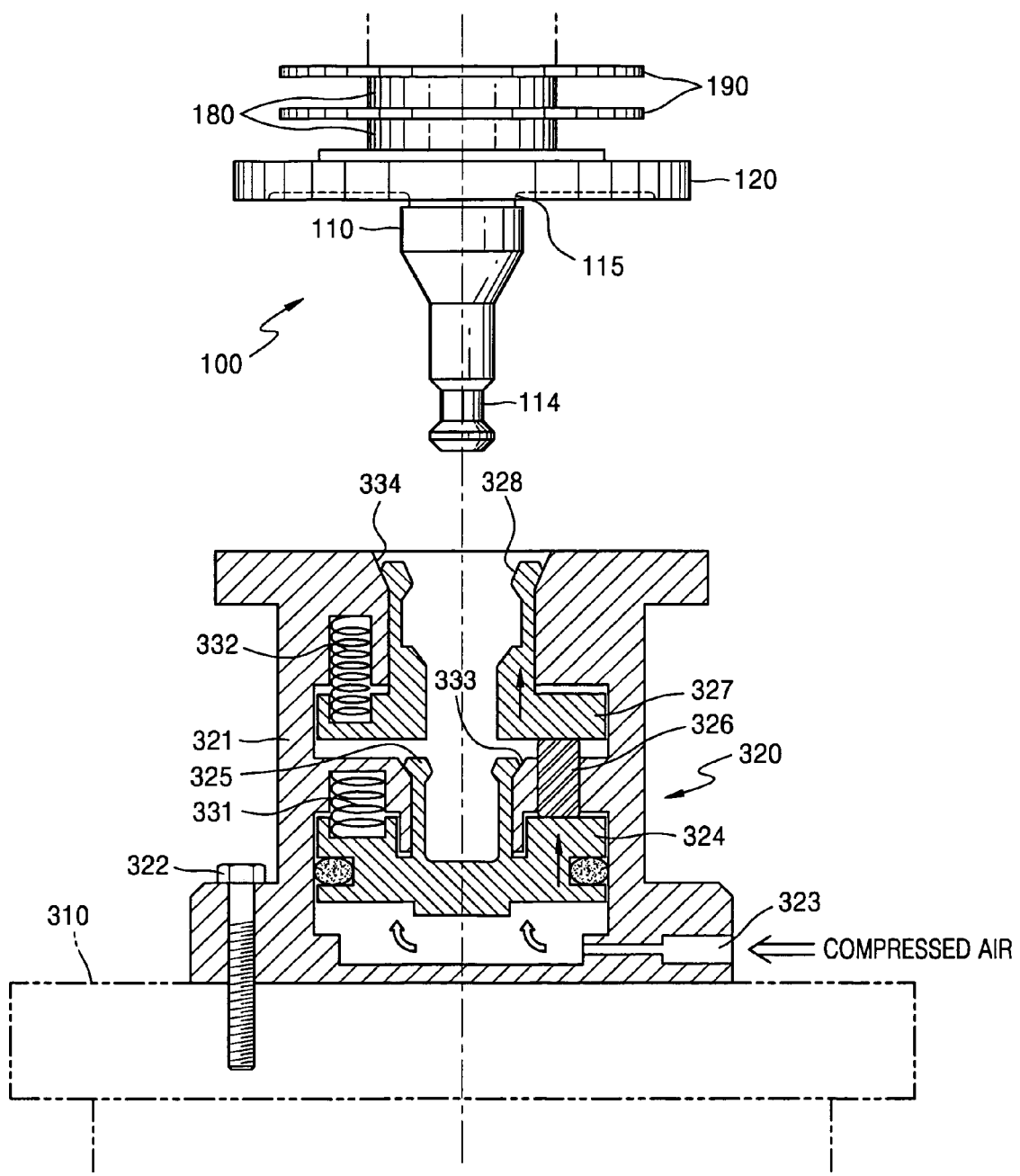
FIG. 5 are side and sectional views illustrating an assembly structure of a mounting portion of the disk holder shown in FIG. 3 and a chuck of a driving motor in a state in which the mounting portion is about to be inserted into the chuck consistent with the present invention.

FIG. 5 are side and section views illustrating an assembly structure of a mounting portion of the disk holder shown in FIG. 3 and a chuck of a driving motor in a state in which the mounting portion is about to be inserted into the chuck, consistent with the present invention.

Referring to FIG. 5, the disk holder 100 is installed at a driving motor 310 of the off-line servo-track writer in a state in which the plurality of disks 190 are assembled to the disk holder 100. Concretely, the mounting portion 110 of the disk holder 100 can be installed at a chuck 320 joined to the driving motor 310 by inserting the mounting portion 110 into the chuck 320.

The chuck 320 comprises a fixing body 321 to be screwed to the driving motor 310 with screws 322, and a first plunger 324 and a second plunger 327 installed in the fixing body 321 to be movable therein. In addition, the first plunger 324 has a first collet 325, and the second plunger 327 has a second collet 328.

When compressed air is supplied to the inside of the fixing body 321 through an air injection orifice 323 formed at the fixing body 321, the first plunger 324 is moved by the pressure of the compressed air in an arrow direction shown in FIG. 5. At this time, the second plunger 327 is also moved by a push rod 326 installed between the first plunger 324 and the second plunger 327 in the same direction. Accordingly, inlet portions of the first collet 325 and the second collet 328 are loosened by a first slant surface 333 and a second slant surface 334 formed at the fixing body 321.

In this state, when the supply of the compressed air is stopped after the mounting portion 110 of the disk holder 100 is inserted into the inside of the chuck 320, the first plunger 324 and the second plunger 327 are moved by elastic forces of a first spring 331 and a second spring 332 in the opposite arrow direction, respectively. At this time, as the first collet 325 and the second collet 328 are moved along the first slant surface 333 and the second slant surface 334, the inlet portions of the first collet 325 and the second collet 328 are tightened. Accordingly, the first collet 325 and the second collet 328 are caught in a first groove 114 and a second groove 115 formed at the outer circumferential surface of the mounting portion 110, respectively, and therefore the mounting portion 110 is firmly fixed in the chuck 320.

In a state in which the disk holder 100 is installed in the chuck 320 as described above, when the compressed air is supplied to the inside of the fixing body 321 through the air injection orifice 323, the inlet portions of the first collet 325 and the second collet 328 are loosened as described above, and therefore the mounting portion 110 of the disk holder 100 can be separated from the chuck 320 with ease.

The structure of installing the disk holder 100 at the driving motor 310 of the off-line servo-track writer shown and described above is only an exemplary embodiment, and therefore other various mounting structures can be applied to the disk holder 100 consistent with the present invention.

Figure 6:
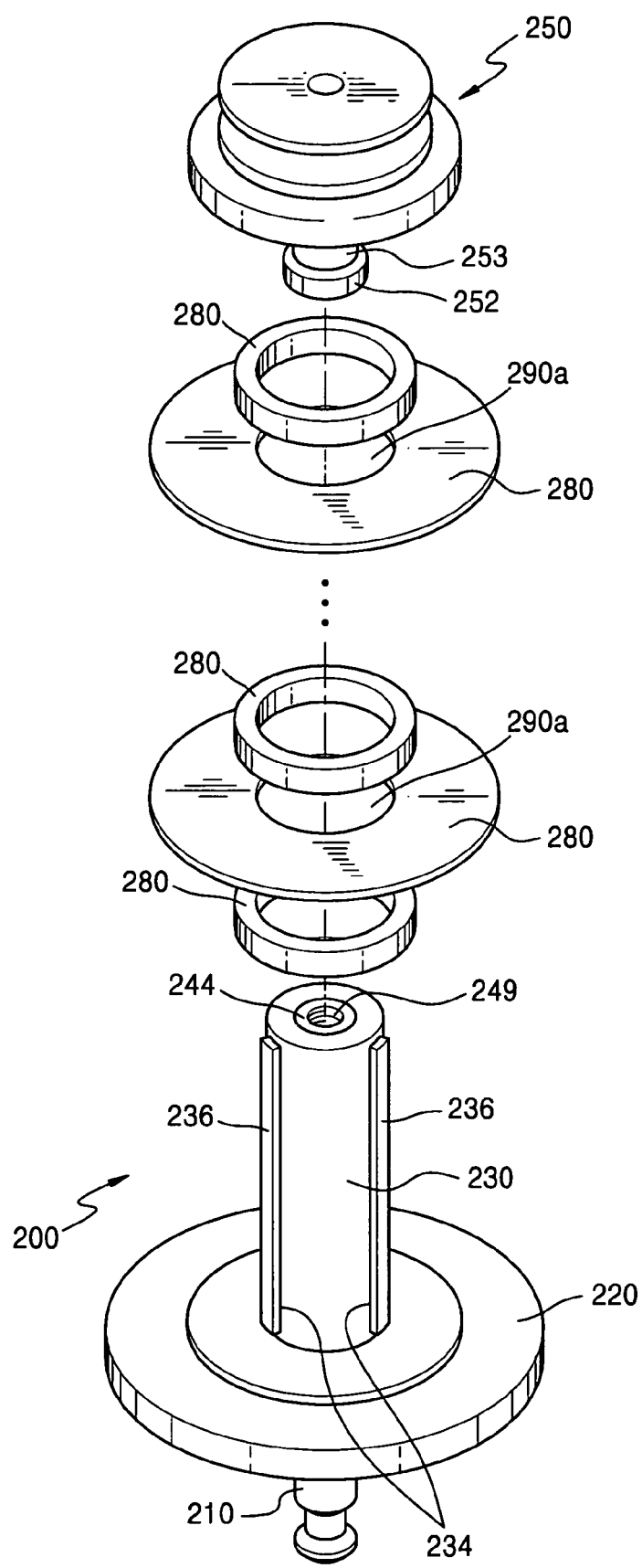
FIG. 6 is an exploded perspective view illustrating a disk holder for an off-line servo-track writer, according to an exemplary embodiment of the present invention.
Figure 7:
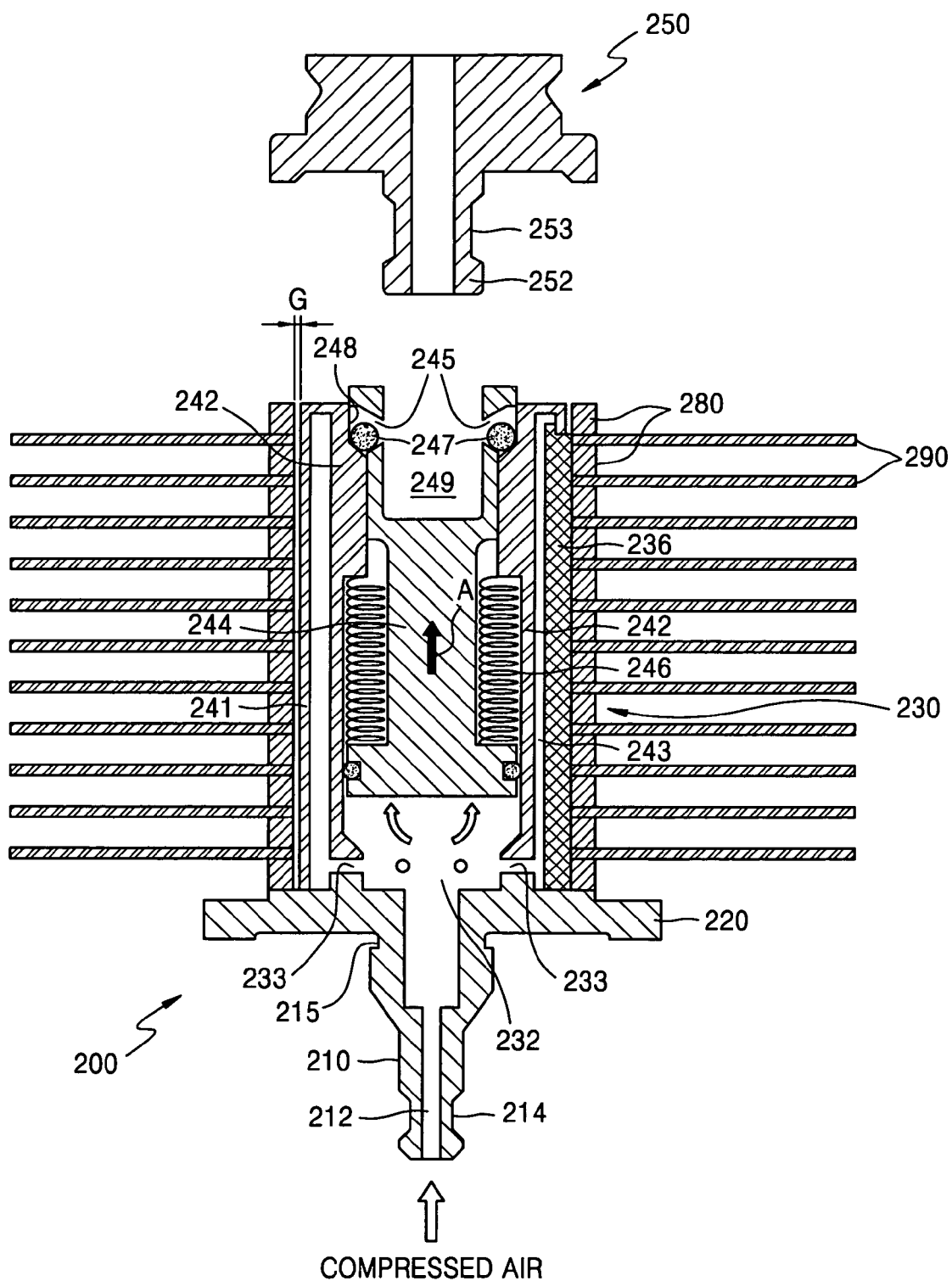
FIG. 7 is a sectional view illustrating the disk holder shown in FIG. 6 in a state in which disks are assembled and a clamp is not assembled consistent with the present invention.
Figure 8:
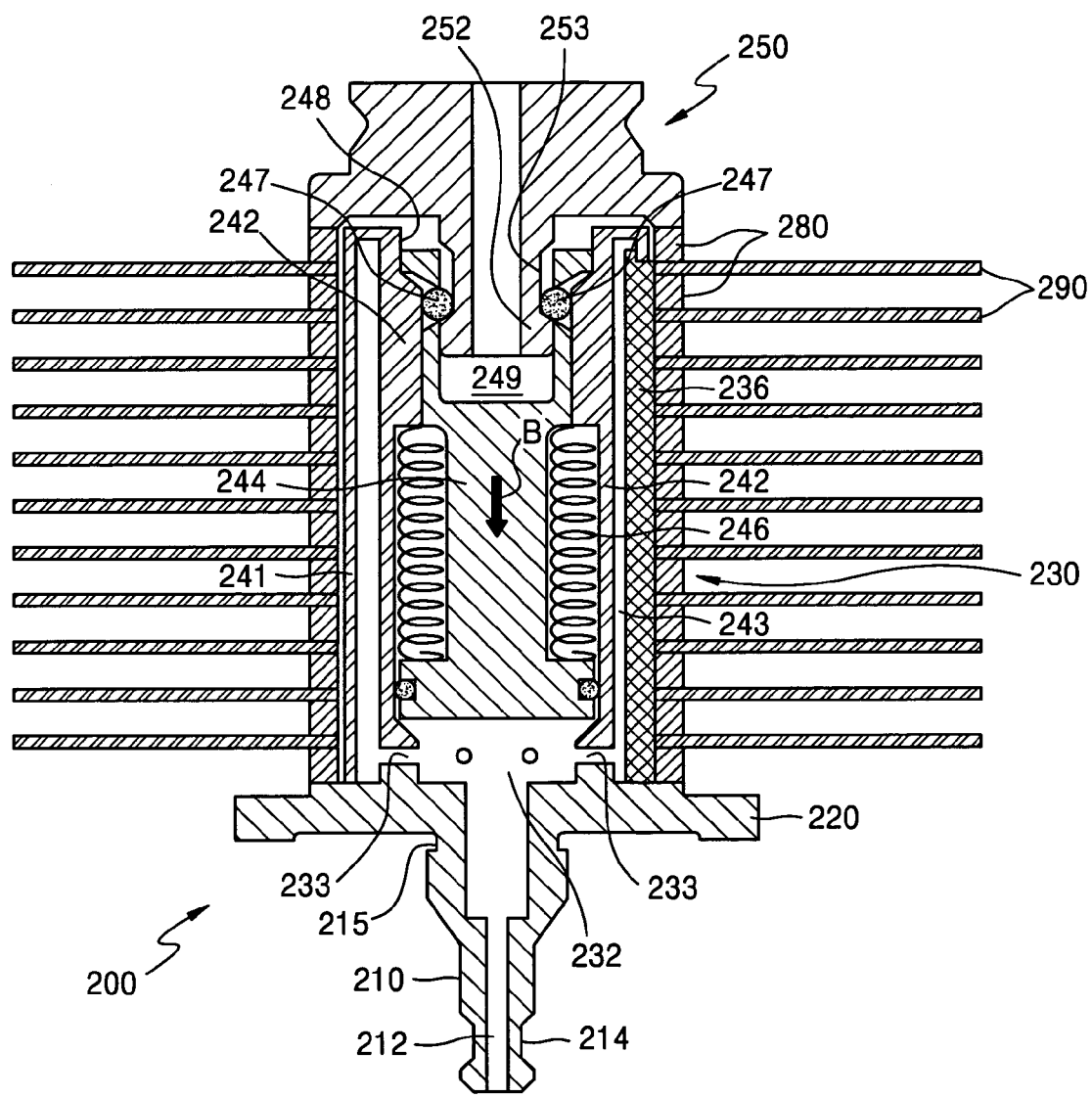
FIG. 8 is a sectional view illustrating the disk holder shown in FIG. 6 in a state in which the disks and the clamp are assembled consistent with the present invention.

FIG. 6 is an exploded perspective view illustrating a disk holder for an off-line servo-track writer according to another embodiment of the present invention, FIG. 7 is a sectional view illustrating the disk holder shown in FIG. 6 in a state in which disks are assembled and a clamp is not assembled, and FIG. 8 is a sectional view illustrating the disk holder shown in FIG. 6 in a state in which the disks and the clamp are assembled.

First, referring to FIGS. 6 and 7, a disk holder 200 comprises a flange 220, a mounting portion 210 provided at one side of the flange 220, a hub 230 which is provided at the other side of the flange 220 and around the outer circumference of which a plurality of disks 290 are assembled, a plurality of pressing members 236 installed on the hub 230, and a clamp 250 joined to an end of the hub 230.

Since the flange 220 has the same structure as the flange 120, a detailed description thereof is omitted. In addition, the mounting portion 210 has an air injection orifice 212 formed therein, and a first groove 214 and a second groove 215 formed at the outer circumferential surface thereof, and can be inserted into and installed at the chuck 320 shown in FIG. 5, as in the previous embodiment described with reference to FIGS. 3 and 4.

The hub 230 is formed to project a predetermined length from the other side surface of the flange 220, and has a dual cylindrical structure, including an external cylinder 241 having a predetermined outside diameter and an internal cylinder 242 installed at the inside of the external cylinder 241 and spaced a predetermined gap from the external cylinder 241. The center axis of the hub 230 is on the same line with the center axis of the mounting portion 210, and coincides with the center axis of the rotating shaft of the driving motor of the off-line servo-track writer. The plurality of the disks 290 and a plurality of spacers 280 for maintaining a gap between the plurality of disks 290 are assembled around the outer circumference of the external cylinder 241. The length of the hub 230 may vary with the number of the disks 290 assembled around the outer circumference of the hub 230. In addition, the outside diameter of the external cylinder 241 has a length slightly smaller that the diameter of the center holes 290a of the disks 290 so that the disks 290 can be easily fitted around the outer circumference of the external cylinder 241. Accordingly, a predetermined gap G is formed between the outer circumferential surface of the external cylinder 241 and the inner circumferential surfaces of the disks 290.

A first air flow space 232 is formed inside the internal cylinder 242, and a second air flow space 243 is formed between the internal cylinder 242 and the external cylinder 241. In addition, a plurality of air channels 233 connecting the first air flow space 232 and the second air flow space 243 are formed at the internal cylinder 242. Air flows into the first air flow space 232 through an air injection orifice 212 formed in the mounting portion 210, and also a portion of the air flows into the second air flow space 243 through a plurality of air channels 233.

The plurality of pressing members 236 are installed at the external cylinder 241 to be able to move back and forth in a radial direction. Concretely, a plurality of slots 234 extended in the lengthwise direction of the external cylinder 241 are formed at the external cylinder 241 equidistantly along the circumference of the external cylinder 241, and the plurality of pressing members 236 are inserted and installed in the plurality of slots 234, respectively. The number of the slots 234 and the pressing members 236 may be three, respectively, and the slots 234 and the pressing members 236 are provided equidistantly along the circumference of the external cylinder 241. However, the number is not limited to three, and the number of the slots 234 and the pressing members 236 may be four or greater, respectively. The pressing members 236 can be projected out of the outer circumferential surface of the external cylinder 241 by the pressure of air flowing into the second air flow space 243. The projected pressing members 236 are pressed to the inner circumferential surfaces of the disks 290 and the spacers 280.

The clamp 250 is attached to one end of the hub 230 so as to press the disks 290 and the spacers 280 and fix them. In this embodiment, the clamp 250 has a rod 252 which is inserted into the internal cylinder 242 of the hub 230, and a groove 253 is formed at the outer circumferential surface of the rod 252. In addition, a fixing means for fixing the rod 252 of the clamp 250 is provided in the internal cylinder 242.

The fixing means comprises a movable plunger 244 installed in the internal cylinder 242 to be able to move upward and downward, and a spring 246 installed between the internal cylinder 242 and the movable plunger 244 for applying a predetermined elastic force to the movable plunger 244. A rod hole 249 into which the rod 252 is inserted is formed at one end of the movable plunger 244, and a plurality of bearing accommodating holes 245 for accommodating a plurality of bearings 247 are formed around the rod hole 249 of the movable plunger 244. It is preferable that each of the plurality of bearing accommodating holes 245 be formed to have a shape tapering toward the rod hole 249 so that the bearings 247 cannot be separated from the respective bearing accommodating holes 245 and fall into the rod hole 249. In addition, a bearing withdrawal groove 248 is formed at the inside surface of one end portion of the internal cylinder 242 so that the bearings 247 can withdraw therefrom.

A procedure of assembling the plurality of disks 290 to the disk holder 200 having the above-described structure, and a procedure of joining the clamp 250 to the disk holder 200 will now be described with reference to FIGS. 7 and 8.

First, in a state in which compressed air is not supplied to the first air flow space 232 and the second air flow space 243 in the hub 230, the plurality of disks 290 and the plurality of spaces 280 are assembled around the outer circumference of the external cylinder 241 of the hub 230. At this time, since the plurality of pressing members 236 installed at the external cylinder 241 can be pushed toward the inner side of the external cylinder 241, the disks 290 and the spacers 280 can be assembled to the external cylinder 241 easily, without interfering with the pressing members 236.

Subsequently, compressed air is supplied to the first air flow space 232 in the internal cylinder 242 of the hub 230 through an air injection hole 212 formed at the mounting portion 210, and then a portion of the compressed air flows into the second air flow space 243 through the plurality of air channels 233. Then, while the pressing members 236 are projected out of the outer circumferential surface of the external cylinder 241 by the pressure of the compressed air, the pressing members 236 are pressed the inner circumferential surfaces of the disks 290 and the spacers 280. At this time, since the plurality of disks 290 are in contact with the plurality of pressing members 236 and receive uniform forces along a circumferential direction as previously described, the rotational center axes of the respective disks 190 coincide with the rotation center axis of the hub 130, and, therefore, eccentric assembly of the plurality of disks 190 can be prevented.

At the same time, the movable plunger 244 is moved in an arrow direction A by the pressure of compressed air flowing into the first air flow space 232 in the internal cylinder 242. At this time, the plurality of bearings 247 withdraw to the bearing withdrawal groove 248, and, accordingly, the rod 252 of the clamp 250 can be inserted into the rod hole 249 formed in the end portion of the movable plunger 244.

Next, referring to FIG. 8, when the supply of compressed air is stopped in a state in which the rod 252 is inserted in the rod hole 249, the movable plunger 244 is moved in an arrow direction B by the elastic force of the spring 246. Then, the plurality of bearings 247 interfere with the inner circumferential surface of the internal cylinder 242, are pushed toward the rod 252, and are caught by the groove 253 formed at the outer circumferential surface of the rod 252. Therefore, the rod 252 is fixed in the rod hole 249 in the inserted state, and the clamp 250 firmly fixes the disks 290 and the spaces 280. Then, even when the supply of compressed air is stopped, and the pressure applied to the pressing members 236 disappears, the disks 290 and the spacers 280 can be maintained firmly by the clamp 250.

In a state in which the clamp 250 is fixed to the hub 230 as described above, when compressed air is supplied to the inside of the hub 230 through the air injection orifice 212, the movable plunger 244 is moved in the arrow direction A, and accordingly, the bearings 247 withdraw to the bearing withdrawal groove 248, therefore, the rod 252 can be separated from the hub 230.

In addition, the disk holder 100 shown in FIG. 3 can also be applied to the disks 190 having a relatively small diameter, for example, a diameter smaller than 1", and the disk holder 200 shown in FIG. 6 can be also applied to the disks 290 having a diameter greater than 1", for example, a diameter of 3.5" or a diameter of 2.5". However, the diameters of the disks 190 and 290 are not limited to the exemplary values.

As described above, when a plurality of disks are assembled to a hub of a disk holder, eccentric assembly of disks can be minimized or prevented by using a plurality of pressing members provided at the hub. Therefore, positions of servo-track information individually written to the disks are uniform, and phase disparity between the disks and repeating vibration of the disks which may occur when a plurality of disks are assembled to a spindle motor of a hard disk drive can be minimized.

While this invention has been particularly shown and described with reference to exemplary embodiments thereof, it will be understood by those skilled in the art that various changes in form and details may be made thereto without departing from the spirit and scope of the invention as defined by the appended claims.

What is claimed is:

1. A disk holder installed at a driving motor of an off-line servo-track writer, the disk holder comprising:

a flange supporting a plurality of disks;

a mounting portion provided at one side of the flange and joined to the driving motor;

a hub provided at the other side of the flange and having a space into which air flows, the plurality of disks and a plurality of spacers for maintaining a gap between the plurality of disks being assembled around an outer circumference of the hub;

a plurality of pressing members installed on the hub to be able to move back and forth in a radial direction of the hub by the pressure of air flowing into the hub, thereby being projected out of an outer circumferential surface of the hub and pressing inner circumferential surfaces of the plurality of disks and the plurality of spacers; and a clamp joined to one end portion of the hub and fixing the plurality of disks and the plurality of spacers, wherein each of the plurality of pressing members presses the inner circumferential surface of all of the plurality of disks simultaneously.

2. The disk holder according to claim 1, wherein the hub has a cylindrical shape.

3. The disk holder according to claim 2, wherein a plurality of slots extended in a lengthwise direction of the hub are formed equidistantly along the outer circumference of the hub, and the plurality of pressing members are inserted into and installed in the plurality of slots.

4. The disk holder according to claim 3, wherein the number of the pressing members is three.

5. The disk holder according to claim 1, wherein the clamp is joined to the one end portion of the hub with a screw.

6. The disk holder according to claim 1, wherein the clamp has a rod, that is inserted and fixed into the hub.

7. The disk holder according to claim 6, wherein the hub has an external cylinder and an internal cylinder, and the internal cylinder is installed in the external cylinder to be spaced a predetermined gap from the external cylinder.

8. The disk holder according to claim 7, wherein a first air flow space is formed in the internal cylinder, and a second air flow space is formed between the internal cylinder and the external cylinder, and a plurality of air channels for connecting the first air flow space and the second air flow space are formed at the internal cylinder.

9. The disk holder according to claim 7, wherein a plurality of slots extended in the lengthwise direction of the external cylinder are formed equidistantly along the outer circumference of the external cylinder, and the plurality of pressing members are inserted into and are installed in the plurality of slots.

10. The disk holder according to claim 7, wherein a fixing means for fixing the rod of the clamp to the hub is provided in the internal cylinder.

11. The disk holder according to claim 10, wherein the fixing means comprises:
a movable plunger which is installed in the internal cylinder to be able to move upward and downward and having at one end a rod hole into which the rod is inserted;
a spring installed between the internal cylinder and the movable plunger for applying a predetermined elastic force to the movable plunger;
a plurality of bearing accommodating holes formed around the rod hole of the movable plunger;
a plurality of bearings accommodated in the plurality of bearing accommodating holes; and
a bearing withdrawal groove formed at an inner surface of one end portion of the internal cylinder,
wherein when the rod is inserted into the rod hole, and the movable plunger is moved in one direction by the elastic force of the spring, the plurality of bearings are caught by a groove formed at the outer circumferential surface of the rod, thereby fixing the rod in the rod hole, and
when the movable plunger is moved in the opposite direction by the pressure of air flowing into the internal cylinder, the plurality of bearings withdraw to the bearing withdrawal groove, thereby separating the rod from the rod hole.

12. The disk holder according to claim 11, wherein each of the plurality of bearing accommodating holes has a tapered shape so that the bearings cannot be separated from the respective bearing accommodating holes.

13. The disk holder according to claim 1, wherein an air injection orifice for injecting air to the inner space of the hub is formed in the mounting portion.

14. The disk holder according to claim 1, wherein the mounting portion is inserted and installed into a chuck joined to the driving motor.

15. The disk holder according to claim 14, wherein the mounting portion is fixed by a collet installed in the chuck, and when the collet is loosened by the pressure of air supplied to the inside of the chuck, the mounting portion is separated from the chuck.

16. A disk holder installed at a driving motor of an off-line servo-track writer, the disk holder comprising:
a flange supporting a plurality of disks;
a mounting portion which is provided at one side of the flange and is joined to the driving motor, and in which an air injection orifice is formed;
a hub which is provided at the other side of the flange and has a cylindrical shape, and in which a space into which air flows through the air injection orifice is formed, and the plurality of disks and a plurality of spacers for maintaining a gap between the plurality of disks being assembled around an outer circumference of the hub;
a plurality of pressing members installed on the hub to be able to move back and forth in a radial direction of the hub by the pressure of air flowing into the hub, thereby being projected out of an outer circumferential surface of the hub and pressing the inner circumferential surfaces of the plurality of disks and the plurality of spacers; and
a clamp joined to one end portion of the hub with a screw and fixing the plurality of disks and the plurality of spacers,
wherein each of the plurality of pressing members presses the inner circumferential surfaces of all of the plurality of disks simultaneously.

17. A disk holder installed at a driving motor of an off-line servo-track writer, the disk holder comprising:
a flange supporting a plurality of disks;
a mounting portion which is provided at one side of the flange and is joined to the driving motor, and in which an air injection orifice is formed;
a hub which is provided at the other side of the flange, has an external cylinder and an internal cylinder installed in the external cylinder to be spaced a predetermined gap from the external cylinder, a first air flow space into which air flows through the air injection orifice being formed in the internal cylinder, a second air flow space being formed between the internal cylinder and the external cylinder, a plurality of air channels for connecting the first air flow space and the second air flow space being formed at the internal cylinder, and the plurality of disks and a plurality of spacers for maintaining a gap between the plurality of disks being assembled around the outer circumference of the external cylinder;
a plurality of pressing members installed at the external cylinder of the hub to be able to move back and forth in a radial direction of the hub by pressure of air flowing into the second air flow space, thereby being projected out of the outer circumferential surface of the external cylinder and pressing the inner circumferential surfaces of the plurality of disks and the plurality of spacers; and
a clamp joined to one end portion of the hub and fixing the plurality of disks and the plurality of spacers, and having a rod inserted and fixed into the internal cylinder of the hub.

* * * * *